United States Patent
Ioannou

(10) Patent No.: US 9,903,036 B2
(45) Date of Patent: Feb. 27, 2018

(54) METHOD OF MANUFACTURING ROTOGRAVURE CYLINDERS

(71) Applicant: ARTIO SARL, Sousse (TN)

(72) Inventor: Ioannis Ioannou, Rodopoli (GR)

(73) Assignee: Paramount International Services (MH)

( * ) Notice: Subject to any disclaimer, the term of this patent is extended or adjusted under 35 U.S.C. 154(b) by 231 days.

(21) Appl. No.: 14/433,353

(22) PCT Filed: Oct. 10, 2013

(86) PCT No.: PCT/EP2013/071195
§ 371 (c)(1),
(2) Date: Apr. 2, 2015

(87) PCT Pub. No.: WO2014/057052
PCT Pub. Date: Apr. 17, 2014

(65) Prior Publication Data
US 2015/0259817 A1    Sep. 17, 2015

(30) Foreign Application Priority Data
Oct. 10, 2012    (EP) ..................................... 12187941

(51) Int. Cl.
*C23C 4/18*        (2006.01)
*C23C 14/58*       (2006.01)
(Continued)

(52) U.S. Cl.
CPC .................. *C25D 5/10* (2013.01); *B32B 1/00* (2013.01); *B32B 15/017* (2013.01); *B41C 1/18* (2013.01);
(Continued)

(58) Field of Classification Search
None
See application file for complete search history.

(56) References Cited

U.S. PATENT DOCUMENTS 4,334,966 A    6/1982    Beach et al.
4,556,610 A    12/1985   Van Heuvelen
(Continued)

FOREIGN PATENT DOCUMENTS

DE    WO 9426534 A1 *   11/1994    ............... B41N 1/20
EP    0092285 A1        10/1983
WO    2011073695 A2     6/2011

OTHER PUBLICATIONS

Machine translation of WO 9426534 of Kuehn et al, published Nov. 1994.*

(Continued)

*Primary Examiner* — Brian W Cohen
(74) *Attorney, Agent, or Firm* — Banner & Witcoff, Ltd.

(57) ABSTRACT

A method for manufacturing rotogravure cylinders with a cylinder base made of aluminum. The method involves the coating of the cylinder surface with high velocity spraying, the copper plating in an appropriate solution, the engraving of the cylinder, and the hardening of the cylinder by chromium plating.
The spraying process is accomplished by High-Velocity Air-Fuel or High-Velocity Oxygen-Fuel thermal spraying which leads to less surface porosity, better adhesion of the copper substrate and better dimensional accuracy.

8 Claims, 3 Drawing Sheets

(51) Int. Cl.
| | |
|---|---|
| C25D 5/34 | (2006.01) |
| C25D 5/10 | (2006.01) |
| B41C 1/18 | (2006.01) |
| B41N 1/20 | (2006.01) |
| C25D 5/36 | (2006.01) |
| C25D 5/48 | (2006.01) |
| C25D 7/04 | (2006.01) |
| B32B 1/00 | (2006.01) |
| B32B 15/01 | (2006.01) |
| B41F 13/187 | (2006.01) |
| B65B 61/26 | (2006.01) |
| C25D 5/44 | (2006.01) |
| C25D 3/38 | (2006.01) |
| C25D 11/38 | (2006.01) |

(52) U.S. Cl.
CPC .............. *B41F 13/187* (2013.01); *B41N 1/20* (2013.01); *B65B 61/26* (2013.01); *C23C 4/18* (2013.01); *C25D 5/36* (2013.01); *C25D 5/44* (2013.01); *C25D 5/48* (2013.01); *C25D 7/04* (2013.01); *C25D 3/38* (2013.01); *C25D 11/38* (2013.01); *Y10T 428/1275* (2015.01)

(56) References Cited

U.S. PATENT DOCUMENTS

| | | |
|---|---|---|
| 4,781,801 A | 11/1988 | Frisby |
| 5,417,841 A | 5/1995 | Frisby |
| 7,153,408 B1 | 12/2006 | Herdman et al. |
| 2004/0018317 A1* | 1/2004 | Heinrich ................ C23C 4/129 427/446 |
| 2012/0240400 A1 | 9/2012 | Ioannou |

OTHER PUBLICATIONS

International Search Report and Written Opinion dated Sep. 10, 2014 (PCT/EP2013/071195); ISA/EP.

* cited by examiner

METHOD OF MANUFACTURING ROTOGRAVURE CYLINDERS

The present application is a U.S. National Phase Entry of International Application No. PCT/EP2013/071195 filed on Oct. 10, 2013, designating the United States of America and claiming priority to European Patent Application No. 12187941.5 filed on Oct. 10, 2012. The present application claims priority to and the benefit of the above-identified applications and the above-identified applications are incorporated by reference herein in their entirety.

FIELD OF THE INVENTION

The present invention refers to a method for manufacturing rotogravure or gravure cylinders.

The invention also relates to the thus obtained rotogravure cylinders

The invention further relates to the use of the rotogravure cylinders in the printing industry for the printing of packaging materials (by transfer of ink from the printing cylinder to the packaging material), such as for instance Intaglio printing processes.

BACKGROUND OF THE INVENTION

Gravure cylinders consist of the base of the cylinder (see FIG. 1 which shows such a cylinder), which is usually made of steel or aluminum (1, FIGS. 1 and 1, FIG. 2), a copper layer (2, FIGS. 1 and 2, FIG. 2) usually 0.5 to 1 mm thick and a protection layer, which is usually a chromium layer typically of 6 to 8 µm thick (3, FIGS. 1 and 3, FIG. 2).

The copper layer is electroplated on the base of the cylinder and forms the surface which is engraved or etched either by chemical or electromechanical (diamond) or electronic (laser) method with the pattern which will be printed (transferred) on the packaging material (paper, plastic film, aluminum foil, etc.). The copper is the dominant surface used for engraving, because it is easy to engrave. The chromium layer on the engraved cylinder protects the surface of the cylinder from the pressure exerted by the doctor blade on the printing cylinder during the printing process (transfer of ink onto the packaging material).

The cylinder body is usually made of steel which satisfies the requirements for precision and small deflection required in the printing process. Alternatively for the printing industry, the cylinder body can be manufactured from a light weight metal like aluminum or an aluminum alloy. Aluminum has specific weight of about 2700 kg/m$^3$, while steel has a specific weight of about 7800 kg/m$^3$. Using aluminum as the cylinder base results in a lighter rotogravure cylinder (by about one third) which means significant reduced transportation costs and safer handling during production phases.

However, aluminum is an electrochemically passive material and it is quite challenging to electro-copper plate it. This has limited the use of aluminium for the base of the cylinder. To the extent that aluminium is used, it requires a plurality of process steps so as to obtain a suitable copper surface for the aluminium body.

One method for the manufacture of rotogravure cylinders comprising an aluminium base, a copper surface and a chrome protection layer is known from WO2011/073695A2. The copper surface is created in a process that comprises no less than six steps.

In a first step, the surface roughness of the underlying cylinder is increased by a mechanical means, such as sand paper, sandblasting. Thereafter, a copper coating of 10-50 µm thickness is deposited in a thermal spraying process. The copper coating is considered to be the substrate for subsequent electroplating. Another surface treatment with sandpaper is then carried out.

In the fourth step, a pre-copper plating step is carried out, wherein a layer of copper of about 100-300 µm is plated. The copper is plated without hardener, resulting in a Vickers hardness of 100-120 HV.

This step is followed by another copper plating step, using a bath that includes a hardener, so as to obtain a copper engraving layer with preferably a Vickers hardness of 200-240 HV. Such a Vickers hardness is known to be optimal for engraving; at lower values, the engraved cell pattern loses definition. In addition, if the hardness exceeds 240 HV, the lifetime of the diamond styli often used to engrave the cylinders during electronic engraving may be reduced. The copper engraving layer of WO2011/073695 is deposited in a thickness of about 200 µm. Finally, a polishing step is carried out to achieve a predetermined surface roughness, suitably in the range of 0.03-0.07 mm.

According to this method, the very hard copper engraving layer is supported with a stack that is less hard. As is well-known, the Vickers hardness of aluminium or an aluminium alloy is relatively low; a medium strength aluminium alloy such as aluminium alloy 6082 is known to have a Vickers hardness of 35 HV. The copper support comprising the copper adhesion layer and particularly the preplated layer therewith has an intermediate hardness between the aluminium base and the hard copper layer. Moreover, in accordance with this method, about half of the at least 0.5 mm copper layer is present as support. This layer thickness is needed, so as to obtain an appropriately homogeneous layer microstructure on top of which the hard copper can be grown.

In further investigations on the cylinders manufactured in accordance with WO2011/073695A2 it was however observed that the reliability of the cylinders was less than desired. Particularly, about 1-5% of the cylinders turned out defect relatively quickly after use by the customer. However, the defects came irregularly, in an unpredictable manner. Such defect clearly resulted in a need for replacement of the defect cylinders, which is undesired.

SUMMARY OF THE INVENTION

It is therefore an object to overcome the known drawbacks from the prior art and to provide a manufacturing method of a rotogravure cylinder with an aluminium base, a copper support and a hard copper layer with good reliability.

It is a further object to provide a resulting rotogravure cylinder with improved properties and the use of such improved cylinder for printing processes.

According to a first aspect of the invention, a method of manufacturing rotogravure cylinders is provided, wherein a copper support is provided onto a cylindrical base, and a copper engraving layer is electroplated on the copper support, and wherein the copper engraving layer is thereafter engraved according to a desired pattern and protected with a protection layer. Herein the provision of the copper support comprises the formation of a copper layer circumferential to the base through at least partial melting of deposited copper particles According to a second aspect of the invention, an intermediate product is provided, comprising a cylindrical base of aluminium onto which a circumferential copper layer extends, the base and the circumferential copper layer having a mutual interface, wherein the circumferential copper layer is obtained with inherent compressive stress onto the underlying base and acts as a support for an electroplated copper engraving layer.

According to a third aspect of the invention, a method of providing a rotogravure cylinder is provided comprising the steps of engraving the engraving layer of the intermediate product with a predetermined pattern and subsequent deposition of a protection layer.

According to further aspects of the invention, provided are a rotogravure cylinder therewith obtainable and the use of such rotogravure cylinder for the printing of packaging materials by transfer of ink from the rotogravure cylinder to the packaging material.

It was found in investigations leading to the inventions that the defects resulted from an insufficient adhesion. Surprisingly, this adhesion could be improved strongly with the improved process of the invention, in which the copper was at least partially melted. It was moreover unexpected that the improved process resulted in a continuous circumferential layer, so as to give rise to compressive stress.

It is an advantage of the present invention that the manufacturing process of gravure cylinder with aluminum base is simplified. Particularly, the roughening treatment of the cylinder surface could be eliminated in comparison to the soft copper surface plating as described in the above mentioned prior art method of WO2011/073695.

More precisely, the invention allows the creation of a copper support that may consist of a single layer, and nevertheless matches the difference in properties between the base, which is particularly of aluminium, and the copper engraving layer with a high hardness. This is achieved in that the copper support comprises a copper layer that extends circumferentially around the base and includes a compressive stress. This compressive stress more particularly results from cooling down of the circumferential layer after at least partial melting. The layer therein has a inherent tendency to contract, and more than the underlying base. This is suitably achieved therein that the copper particles are heated up more than any the cylindrical base.

The copper particles are suitably deposited in a spraying process. More preferably a high velocity spraying process is used. In such a process, the particles are applied with a high speed such as at least 300 m/s onto the cylinder. Suitably, the cylinder herein rotates during the deposition process. The particles will impact on the cylindrical base, which results in liberation of a significant amount of energy in the form of heat. This heat will warm up the particles so as to melt at least partially.

It is an advantage of the invention that the copper support layer and the copper engraving layer may be thin, preferably less than 100 μm each. This is made possible in that the formed circumferential copper layer has a very low porosity, suitably less than 1.0%, preferably less than 0.5% or even less than 0.2%. This is in contrast to the prior art copper support layer of WO2011/073695A2. Analysis of the rotogravure cylinders made in accordance with the prior art demonstrated a large porosity, with a significant spread between individual cylinders, which was merely overcome through deposition of a thick preplating layer.

In one embodiment, the circumferential layer has a thickness of at least 50 μm, more preferably at least 60 μm. This has the advantage that the circumferential layer may have a thickness substantially corresponding to the thickness of the subsequently deposited copper engraving layer.

In an alternative, preferred embodiment, the circumferential layer is provided in a thickness of less than 50 μm, preferably less than 40 μm or even at most 30 μm. A suitable circumferential layer with such a small thickness is achieved with a high velocity spraying step followed by a grinding step.

Most suitably, the circumferential layer is after formation even thinned back. This thinning is for instance carried out by sawing. A lubricant solution may be applied simultaneously with the cooling. This process furthermore results in a suitable polishing of the surface of the circumferential layer. The polished circumferential layer is then suitable for the electroplating of the copper engraving layer.

BRIEF INTRODUCTION OF THE FIGURES

These and other aspects of the invention will be further elucidated with respect to the following figures, wherein.

ILLUSTRATED DISCUSSION OF DETAILED EMBODIMENTS

Figure 1:
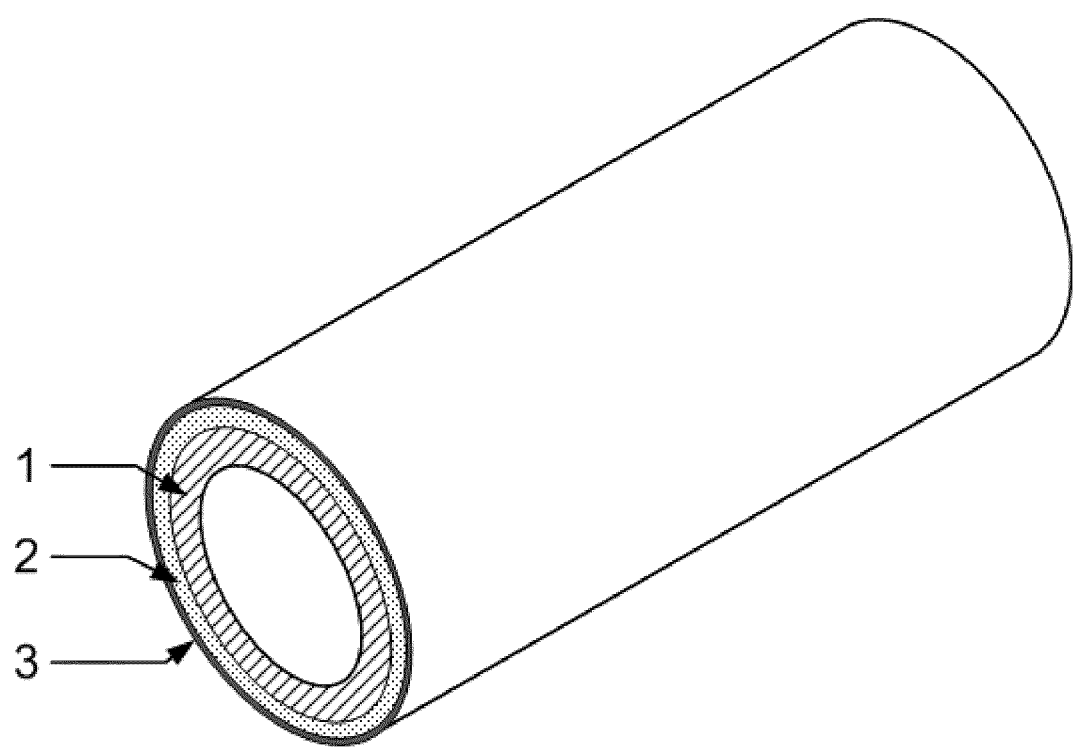
FIG. 1 shows a diagrammatical bird's eye view of a rotogravure cylinder.
Figure 2:
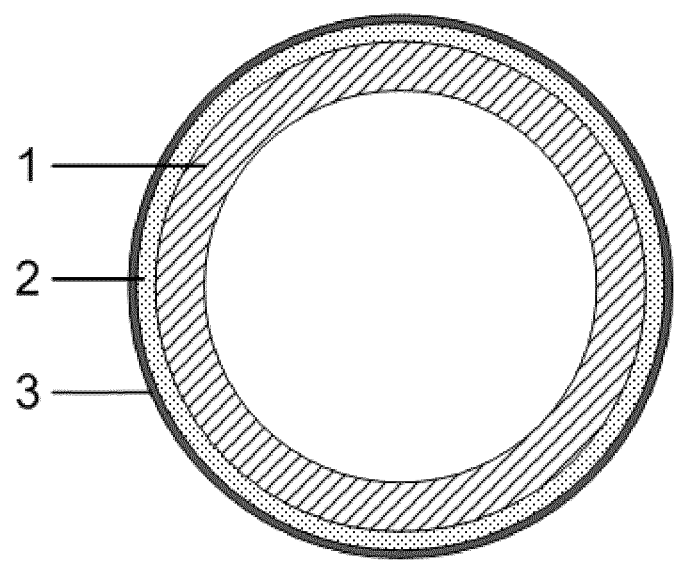
FIG. 2 shows a diagrammatical cross-sectional view of the rotogravure cylinder.
Figure 3:
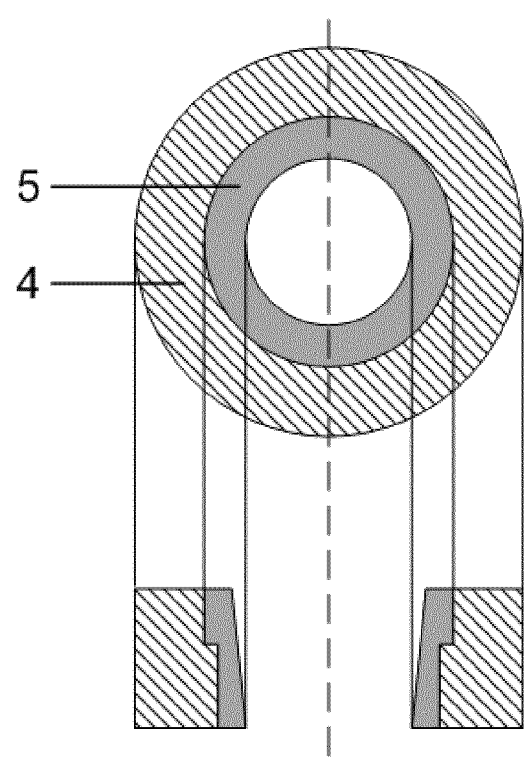
FIG. 3 shows a diagrammatical view of end plates for the rotogravure cylinder

The FIGS. 1, 2 and 3 are not drawn to scale and they are only intended for illustrative purposes. Equal reference numerals in different figures refer to identical or corresponding figures.

The term 'rotogravure cylinders" relates herein to rotogravure cylinders and/or any gravure cylinders used in the printing industry, particularly for the printing of packaging materials. The length of such cylinders is typically at least 1.0 meter, more preferably in the order of 1.5-2.5 meter.

The term 'cylindrical base' as used in the context of the present invention does not require the base to be a block-like material. Rather the base may be hollow. Alternatively, the base may comprise several layers, such as a steel core and an aluminium top layer.

The term aluminum in the present invention refers to pure aluminum, aluminum with small addition of other materials or aluminum alloys. Likewise, the term copper refers to pure copper, copper with small addition of other materials or copper alloys. Most suitably, however, in the process in accordance with a preferred embodiment of the invention, particles are sprayed that contain at least 99% copper, more preferably at least 99.5% copper or more.

The term high velocity spraying relates to a spraying process wherein particles are sprayed with a velocity of at least 300 m/s, more preferably at least 500 m/s, at least 800 m/s or even at least 1,000 m/s. Preferably, use is made of a jet with a velocity above the said particle velocity. Generation of a supersonic jet is considered most advantageous. Herein, the jet velocity may be higher than 1,400 m/s.

High velocity spraying may for instance be implemented with High-Velocity Air Fuel (HVAF) technology and guns as commercially available from UniqueCoat Technologies, LLC from Oilville, Va. 23129, USA.

The term 'at least partial melting' refers to a process wherein at least the surface of individual particles is melted so as to create a homogeneous layer. It is not excluded that inner cores of the said particles remain in solid form. It is moreover not excluded that the circumferential layer created by melting of copper particles is actually an alloy with some aluminium of the underlying cylindrical base. Such an alloy may well be created, particularly close to the interface with the cylindrical base. The composition of the circumferential layer further away from the cylindrical base may thus be different from the composition near to said interface.

In the preferred embodiment wherein the copper particles are sprayed onto the base in a high velocity process, it is foreseen that the impact of the copper particles onto the base may result in deformation and fracture of the top layer of the base. Such deformation is deemed beneficial so as to obtain a larger interface area and/or some mechanical anchoring of the copper into the aluminium. The subsequent melting and furthermore the thinning step are highly suitable in combination therewith, so as to ensure appropriate dimensions and particularly appropriate roundness when seen in cross-sectional view perpendicular to an axial direction of the cylindrical base.

In one preferred embodiment, a gravure cylinder with an aluminium base was produced from an aluminum tube to the desired dimensions. Thereafter, a high velocity spraying process was used for spraying of copper particles. Use was made of a gun as available from UniqueCoat Technologies, LLC, as sold as M3. The copper particles, with an average diameter of less than 50 µm, preferably in the range of 40-45 µm, were sprayed with a jet velocity of 1,200-1,400 m/s, resulting in a particle velocity of 900-1000 m/s. During the spraying process, the cylinder was rotated. Impact of the substantially pure copper particles onto the cylinder resulted in deformations in the aluminum cylinder, and in heating up of the particles, to the extent of at least partial melting. This melting resulted in formation of a single layer extending circumferential around the base. Compressive stress developed in the course of cooling down. This cooling down was achieved by waiting in one embodiment; in an alternative embodiment, jetted air was sprayed onto the cylinder with the circumferential layer. For the jet spraying, the same gun as mentioned above was used, but this is not considered essential.

In one embodiment, the resulting layer had a thickness of approximately 125 µm. This layer was thereafter thinned and polished, by means of a sawing process. Use was made of a diamond saw, as known for the sawing of copper or copper-containing elements. A lubricant was sprayed while sawing so as to prevent too much heating of the copper layer. Moreover, herewith a polishing was achieved as well. The sawing resulted in removal of about 50 µm thickness of copper. The copper support, here consisting of the copper circumferential layer, was therewith ready. It is however not excluded that additional layers are deposited.

In an alternative embodiment, the deposited layer had a thickness of 40-80 microns, for instance about 50 microns. This layer was thereafter thinned, for instance with 40-60%. Use was made herein of grinding with a conventional grinding machine with grinding and polishing stones.

The resulting surface roughness Rz, as for instance achieved with the latter embodiment with a final layer thickness between 20 and 40 microns, was suitably less than 0.5 µm. As known to the skilled person, various parameters of surface roughness exist, which have been defined in norms DIN EN ISO 4287:1998 and DIN EN ISO 4288:1998. The surface roughness Rz, also known as the (average) surface roughness depth or the ten-pint mean roughness. It is defined as the arithmetic mean value of the single roughness depths of consecutive sampling lengths. More suitably the surface roughness Rz was less than 0.4 µm, for instance between 0.2 and 0.4 µm, and in one preferred embodiment close to 0.3 µm (i.e. 0.25-0.35 µm).

In a subsequent step, a copper engraving layer with a high hardness, suitably in the range of 200-240 HV, was deposited. The layer was deposited in a thickness of 60-100 µm, for instance 75 µm. In one embodiment, a layer thickness was chosen that was substantially corresponding to the layer thickness of the copper support. However, thicker layers are not excluded. The deposition process for such an engraving layer is known per se and involves electroplating. Use was made in one embodiment of a solution of copper sulfate (200-230 gr $CuSO_4 \times 5H_2O$) and sulfuric acid (60-65 gr $H_2SO_4$ per liter of solution) and a catalyst for hardness. The catalyst does not have any particular properties and can be found easily in the market. During the plating, the cylinder is revolved with a speed of about 100 rpm. The current density during electroplating in this phase ranges from 20 to 25 amps/$dm^2$ for about 80-100 min and with a solution temperature maintained at about 30° C. Further details in relation to this process are known from various patents, such as U.S. Pat. No. 4,334,966, U.S. Pat. Nos. 4,781,801, 5,417,841 and 7,153,408, which are herein included by reference.

In an alternative embodiment, which was tested particularly in combination with a ground and thin circumferential layer as discussed above, the copper engraving layer was formed by deposition and subsequent thinning and polishing. Here again, a thinning to approximately half of the deposited thickness turned out suitable in practice. However, it is not excluded that the thinning removes merely 20-40% of the deposited thickness.

Thereafter, the cylinder was polished to achieve desired surface roughness (usually $R_z$ is between 0.03 µm and 0.07 µm). The intermediate product was therewith ready. In a subsequent step, this intermediate product was engraved in accordance with a desired and predefined pattern. Use could be made of any engraving technique known per se, including so called electronic engraving. Use of a laser appears beneficial. The engraving could be carried out in a different location if so desired. After the engraving, a protection layer was applied. This protection layer is suitably a chromium coating layer of about 6 to 10 µm, and was produced by plating in a chromium oxide solution (250-280 gm of $Cr_2O_3$ per solution liter) and sulfuric acid (2.5-2.8 gm of $H_2SO_4$ per solution liter) for about 30 min.

In order to further reduce the weight of the gravure cylinder, the end plates of the gravure cylinders (typical cross sections of an end plate is shown in FIG. 3) are made of two materials, one light weight (4, FIG. 3), e.g. aluminum and steel (5, FIG. 3). The typical thickness of the end plates is 25 mm. The steel is used for the part of the end plate which comes into contact with the support of the printing machines because steel has better wear resistance and higher strength compared to aluminum.

The dimensions of the end plate are determined by the customer specifications. This is why the dimensions (and the keyway) are not shown in FIG. 3. The proportion of aluminum to steel is determined by the dimensions of the end plate. The bigger the end plate the higher the percentage of aluminum used. The idea is to keep the steel part at minimum weight.

The manufacturing of the end plates are made using the following simple steps:

a) The outer diameter of the aluminum end plate part (4, FIG. 3) is manufactured to fit the internal diameter of the cylinder base. The inner diameter of the aluminum end plate part is made to fit the outer diameter of the steel end plate part.

b) The outer diameter of the steel end plate part (5, FIG. 3) is manufactured to fit the inner diameter of the aluminum end plate part.

c) The assembly of the aluminum and steel part of the end plates are is accomplished simply by heating (normal or induction heating) and press fitting the two parts.

Although the above description is the recommended methodology for the manufacturing of a light weight gravure cylinder with a base made of aluminum and end plates made from aluminum and steel, it is apparent to the experts of the field that small deviations or alterations or modifications can be implemented without significant deviations from the present invention.

Test Results

Semimanufactured cylinders made in according with the prior art of WO2011/073695A2 and in accordance with the invention were subjected to a bond strength test. The semi-manufactured cylinders had an aluminum base, a copper support and a copper engraving layer. No engraving was applied in the copper engraving layer. A protection layer was not applied. The cylinder base in both semi-manufactured cylinders was identical; merely the manufacture of the copper support differed.

Bond strength tests were carried out using a universal testing machine (as supplied from TLCLO, Dartec Ltd, Stourbridge, England). Therein, shear force was applied as close as possible to the aluminum-copper interface at a crosshead speed of 1 mm/min. The ultimate load to failure was recorded in Newton (N), and repeated several times to ensure sufficient statistics. Table 1 provides the results. It is clear therefrom that the bond strength has been significantly improved. Whereas the prior art cylinders had a bond strength that was close to the limit or even below the limit of 15 N, the bond strength in the invention is such that any variation does not matter any longer.

TABLE 1

| sample preparation | bond strength (N) |
|---|---|
| WO2011/073659A2 | 12 N |
| invention | 70 N |

The invention claimed is:

1. Method of manufacturing rotogravure cylinders, wherein a copper support is provided onto a cylindrical base, and a copper engraving layer is electroplated on the copper support, and wherein the copper engraving layer is thereafter engraved according to a desired pattern and protected with a protection layer, wherein the copper support comprises a copper layer circumferential to the cylindrical base formed through at least partial melting of deposited copper particles,
wherein the copper layer circumferential to the cylindrical base is subsequently thinned by grinding to a surface roughness Rz of less 0.5 μm.

2. The method as claimed in claim 1, further comprising the step of cooling down the created circumferential copper layer, resulting in compressive stress.

3. The method as claimed in claim 1, wherein the thinning process further results in polishing of the copper support.

4. The method as claimed in claim 1, wherein the resulting copper support has a thickness of at most 100 μm.

5. The method as claimed in claim 1, wherein the copper engraving layer is formed by deposition followed by thinning.

6. The method as claimed in claim 1, wherein the cylindrical base comprises an aluminum body.

7. The method as claimed in claim 1, wherein the copper particles are deposited in the high velocity thermal spraying process with a velocity of at least 300 m/s.

8. The method as claimed in claim 1, wherein the copper layer circumferential to the base is subsequently thinned and polished by sawing using a diamond saw and spraying a lubricant on the copper layer during sawing.

* * * * *